United States Patent
Ralph et al.

(10) Patent No.: US 8,762,546 B2
(45) Date of Patent: Jun. 24, 2014

(54) METHOD AND APPARATUS FOR ADAPTIVE NETWORK HEARTBEAT MESSAGE FOR TCP CHANNEL

(75) Inventors: Alexander J. Ralph, Bradford-on-Avon (GB); Paul Baker, Eastleigh (GB)

(73) Assignee: Motorola Mobility LLC, Chicago, IL (US)

( * ) Notice: Subject to any disclaimer, the term of this patent is extended or adjusted under 35 U.S.C. 154(b) by 260 days.

(21) Appl. No.: 13/324,063

(22) Filed: Dec. 13, 2011

(65) Prior Publication Data

US 2013/0151714 A1 Jun. 13, 2013

(51) Int. Cl.
*G06F 15/16* (2006.01)

(52) U.S. Cl.
USPC .......................... 709/227; 709/203; 709/219

(58) Field of Classification Search
None
See application file for complete search history.

(56) References Cited

U.S. PATENT DOCUMENTS

| | | | |
|---|---|---|---|
| 5,903,851 A | 5/1999 | Backstrom et al. | |
| 7,577,749 B1 * | 8/2009 | Long | 709/230 |
| 7,774,007 B2 * | 8/2010 | Backholm et al. | 455/466 |
| 8,024,423 B2 | 9/2011 | Donahue et al. | |
| 8,073,964 B2 * | 12/2011 | Dunk | 709/232 |
| 2006/0276141 A1 | 12/2006 | Athalye | |
| 2008/0025226 A1 | 1/2008 | Mogul et al. | |

* cited by examiner

*Primary Examiner* — John B. Walsh

(57) ABSTRACT

A method and apparatus for a client to continue to receive updates from a server when a channel has been disconnected before the expiration of a heartbeat timer is disclosed. The method includes sending a heartbeat message from the client to the server wherein the heartbeat message is sent at the expiration of a timer having a first time interval that is less than the first timeout duration period of the server. The method includes detecting that the channel is disconnected before the expiration of the first time interval and then determining a second timeout duration period from detecting the channel is disconnected. After determining the second time out duration, the method includes resetting the first time interval to a second time interval for the sending of the heartbeat message wherein the second time interval being less than the second timeout duration period.

18 Claims, 5 Drawing Sheets

METHOD AND APPARATUS FOR ADAPTIVE NETWORK HEARTBEAT MESSAGE FOR TCP CHANNEL

FIELD OF THE INVENTION

The present invention relates to maintaining a channel in a wireless communication system and, in particular, to maintaining a channel used to push updates from a server to a client by adapting the timing of a heartbeat message used to maintain the channel.

BACKGROUND

Certain consumer electronic devices including wireless phones and smartphones may require that a connection between the client and a server providing a service or function for the client be maintained or "always on." For wireless communication devices, for example, such a connection uses transmission control protocol/internet protocol (TCP/IP), and this connection is known as a push channel. The push channel is maintained between the client and the server so that the various services can provide updates from the server to the client in a responsive manner instead of the user of the client periodically requesting the update and the update being pulled from the server. Thus, the push channel can be used for the server to update the client on a timely basis instead of relying on the client to periodically pull the update from the server.

As mentioned, the push channel that provides always-on push communications is supported by a continuous TCP/IP connection between the client and the server. In wireless communication networks, however, push channels can be time limited if no resources are being sent over the channel. The push channel can be disconnected for a number of reasons including the poor channel conditions as well as conservation of resources. Thus, the push channel can be recreated under better conditions and when the push channel is needed. In order to avoid the push channel from being disconnected, a client can periodically send a message, known as a heartbeat message, over the push channel so that the push channel is always used and to improve network conditions.

Even with the heartbeat message being sent from the client to the server, the wireless communication network or the server can change the conditions under which the push channel is disconnected. Thus, there is a need to develop a method and apparatus to maintain the push channel so that the server can push updates and other services to clients over the push channel using a wireless communication network.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
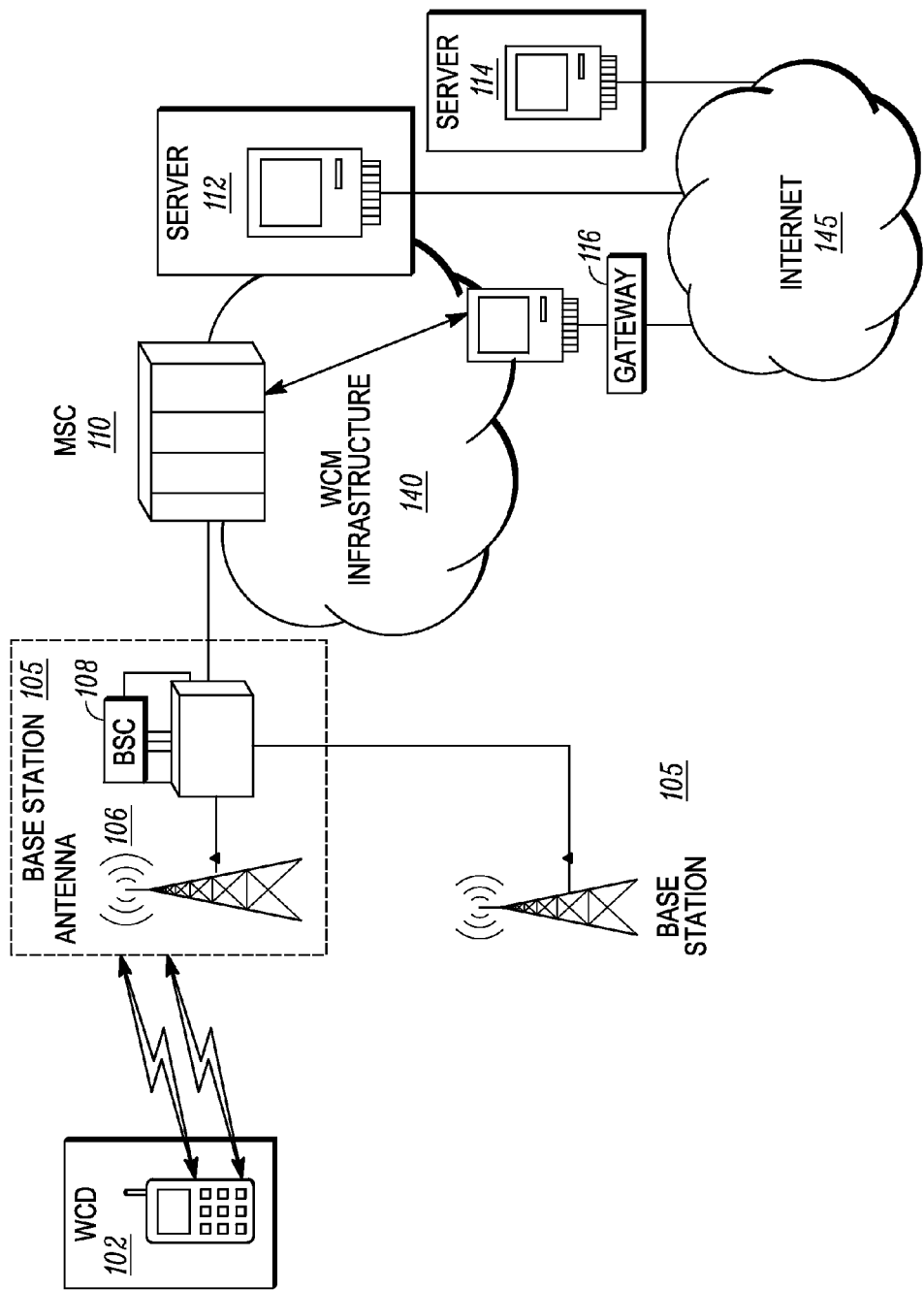
FIG. 1 is an example a wireless communication network used in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to an adaptive heartbeat message used for a TCP/IP channel. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of an adaptive heartbeat message used for a TCP/IP channel described herein. The non-processor circuits may include, but are not limited to, a radio receiver, a radio transmitter, signal drivers, clock circuits, power source circuits, and user input devices. As such, these functions may be interpreted as steps of a method to perform the adaptive heartbeat message used in connection with the TCP/IP channel. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present disclosure is directed to a method and apparatus for a client to continue to receive updates from a server when a TCP/IP channel has been disconnected before the expiration of a heartbeat timer. The heartbeat timer has a first interval at the expiration of which the client sends a heartbeat message over a TCP/IP push channel so that the server does not disconnect the channel. It is known, however, that the server can change the time out duration of the TCP/IP push channel so that the time out duration is less than the first interval of the heartbeat timer.

In order to maintain the TCP/IP channel, a method is disclosed that includes establishing a channel between a server and a client wherein the channel is disconnected after an expiration of a first timeout duration period. In order to maintain the channel, the method includes sending a heartbeat message from the client to the server wherein the heartbeat message is sent at the expiration of a timer having a first time interval. The first time interval is set to be less than the first timeout duration period. In addition, the method includes detecting that the channel is disconnected before the expiration of the first time interval and then determining a second timeout duration period from detecting the channel is disconnected. After determining the second time out duration, the method includes resetting the first time interval to a second time interval for the sending of the heartbeat message wherein the second time interval being less than the second timeout duration period.

In an embodiment, the method also includes reestablishing the channel after detecting that the channel is disconnected. The channel being a push channel used to push services from the server to the client. Moreover, after the channel is disconnected the method includes sending a message from the client to the server to pull services from the server wherein the message request updates from the client for the server. In an embodiment, the method can include sending the second time interval to a central server so that the second time out interval can be used by other clients receiving data from the server when the channel is to be maintained by a heartbeat message.

The first time interval and the second time interval are set to an interval to align updated services provided by the server to the client. The first time interval is also set before at least one of implementation of the client on a wireless communication network and the client connects with the server for a first time. In addition, the channel is disconnected because of at least one of poor channel conditions and non-use of the channel and the channel is a TCP/IP channel to push updates from the client to the server and wherein the client is a wireless communication device such that at least a part of the push channel is provided over a wireless communication connection. Moreover, determining the second time interval includes detecting a given number of channel disconnects to determine the second time interval.

In another embodiment of the described adaptive heartbeat message, a method is disclosed that includes establishing a channel between a client and a server wherein the channel is used for server to push services to the client and wherein the channel can be disconnected after an expiration of a first timeout duration if no data is sent over the channel during the first timeout duration. In addition, the method includes sending a heartbeat message from the client to the server so that data is sent over the channel where the heartbeat message is sent at the expiration of a time interval that is less than the first timeout duration. The method includes detecting that the channel be disconnected by the server before the expiration of the first time interval, and sending a message from the client to the server after the channel is disconnected to pull the services to the client from the server that were pushed from the server when the channel was established. For this described method, the channel can be a transport control protocol/internet protocol channel and the message can be a peripheral device protocol message.

An embodiment of this method can include detecting that the channel is reestablished after the channel is disconnected and determining a second timeout duration wherein at the expiration of the second timeout duration the reestablished channel is disconnected. After the second time out duration is determined, the method includes resetting the first time interval to a second time interval so that the heartbeat message is sent to the server at the expiration of the second time interval and wherein the second time interval is less than the second timeout duration. The determining a second time interval can include detecting a given number of channel disconnects to determine the second time interval. In addition, the method can include sending the second time interval to a central server so that the second time interval can be used by other clients receiving data from the server when the channel is to be maintained by a heartbeat message.

A mobile device can be used as an apparatus that embodies the principles described. The apparatus includes a transceiver for sending messages from a client to a server over a channel and for receiving messages from the server over the channel and a memory for storing a heartbeat timer value wherein the heartbeat timer value being less than a time out duration and wherein after the expiration of the time out duration the channel between the client and the server being disconnected. The apparatus also includes a processor that is coupled between the transceiver and the memory. The processor detects that the channel is disconnected and determines a second time out interval which is less than the first time out interval and resets the heartbeat timer value to a second interval which is less than the determined second time out duration. In addition, the processor further creates a message to be sent by the transceiver to the client to pull services from the server when the channel is disconnected and a message to be sent by the transceiver to a central data base wherein the message contains the second interval to be used by other clients connected to the server.

With specific reference now to FIG. 1, there is depicted a block diagram of an example wireless communications network (WCN) 100, within which certain of the functional aspects of the described embodiments may advantageously be implemented. In particular, WCN 100 can be any of the known or developed wireless communications networks including Code Division Multiple Access (CDMA), Time Division Multiple Access (TDMA), Global System of Mobile Communications (GSM), Orthogonal Frequency Division Multiplex (OFDM) networks and further generations of such networks include 2.5G, 3G, 4G and Long Term Evolution (LTE) networks as well as hybrid or combined network that supports these and other wireless communication protocols. WCN 100 can be any of these wireless communications network in which at least one wireless communication device (WCD) 102 operates with a channel between the wireless communication device serving as a client and a server 112, 114 accessible through the WCN 100 and the internet 145 in order for the server to push applications and application updates to the client. Applications are pushed from a server to client when the server has a new application for a WCD 102 or an update to an application already installed on a WCD 102 where the WCD does not need to send a request or other message to receive such an application or update. When the application or update is ready for use by the WCD, the server 112, 114 automatically sends, or pushes, the application or update to the WCD 102 on its own initiative. The channel that the application or update is pushed over is one that is maintained by a heartbeat message being sent from the WCD 102 serving as a client to the server 112, 114, but can be disconnected by the server. The WCD 102 is able to maintain the channel between the client and the server by adaptively adjusting the heartbeat timer to be less than the time out duration of the channel. In one or more embodiment, WCN 100 utilizes standard signaling to enable communication of specific messages and data between network components, such as MSC 110 and gateway 116, that are a part of WCN infrastructure 140.

WCN 100 includes wireless communications device (WCD) 102, which can be a mobile device, mobile station, a cell phone, a smartphone or other wireless enabled device. In one embodiment, WCD 102 is a subscriber device to WCN 100 and wirelessly connects to the infrastructure of WCN 100 via base station (BS) 105, which comprises base station antenna 106 and a base station controller 108. Base station antenna 106 provides an access point to WCN 100 for WCD 102.

In addition to the base station components 106 and 108, the infrastructure of WCN 100 comprises mobile switching center (MSC) 110, which is connected to BSC 108 as well as to a backbone of interconnected functional servers (not shown) of WCN 100. MSC 110 is a primary service delivery node for communication network protocols, and MSC 110 is responsible for routing voice calls and SMS as well as other services (such as conference calls, facsimile and circuit switched data) between user devices connected to WCN 100. MSC 110 sets up and releases the end-to-end connection (e.g., between wireless communications devices), and MSC 110 handles mobility and hand-over requirements during a call. As shown, MSC 110 connects to and communicates with several other known network components (not shown) and with gateway 116.

Several of the devices are in turn connected to each other via a different background network, indicated as the Internet 145. Thus, as shown, gateway 116, and servers 112, 114 are connected to the Internet 145. As defined herein, the Internet 145 is a worldwide collection of networks and gateways that utilize the Transmission Control Protocol/Internet Protocol (TCP/IP) suite of protocols to communicate with one another. Connection with one or more servers 114 can be established over a channel that extends from the WCD 102 serving as a client via WCN 100 and internet 145.

Figure 2:
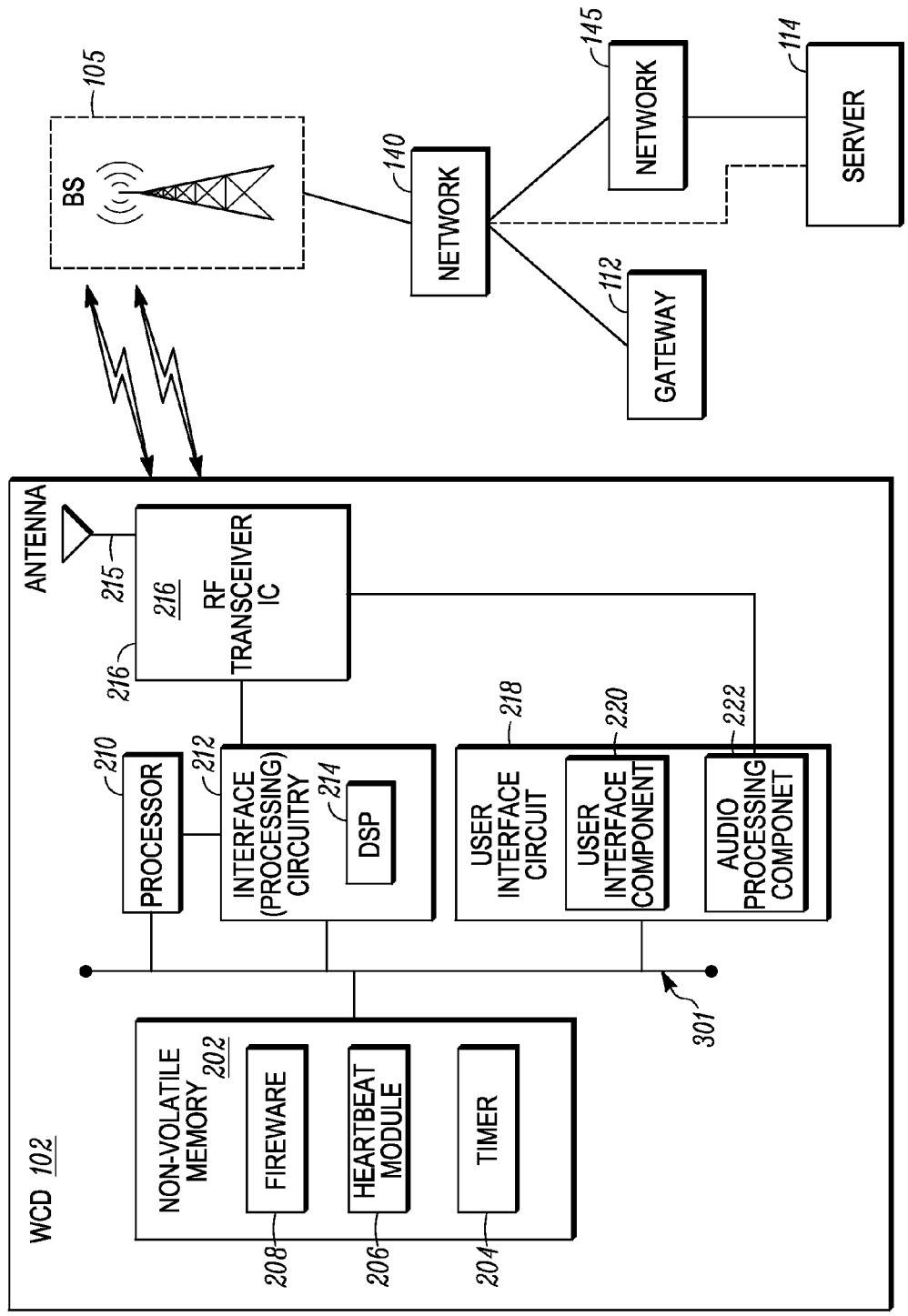
FIG. 2 is a block diagram of a wireless communication device used as a client in accordance with some embodiments of the invention.

FIG. 2 illustrates an example block diagram of an example wireless communications device 102 within a wireless communications network, according to one embodiment. In one embodiment, the wireless communications device is a mobile cellular device or phone. However, in alternate embodiments, WCD 102 can be any type of communication device with a wireless transceiver that enables wireless communication of signals with WCN 100. WCD 102 comprises processor 210 and communication interface circuitry 212, which comprises digital signal processor (DSP) 214. Processor 210 and communication interface circuitry 212 are connected to non-volatile memory 202 via signal interconnect 201. WCD 102 also comprises user interface circuit 218, which comprises or is associated with user interface component(s) 220, e.g., input buttons, keypad, and touch-screen, and audio processing components 222, e.g., audio speaker and microphone.

WCD 102 includes a radio frequency (RF) transceiver integrated circuit (IC) 216 and antenna 215 that enable WCD 102 to send and receive communication signals via a wireless air interface, illustrated by the bi-directional arrow between antenna 215 and BS 105. In at least one embodiment, the transmitting and receiving functions of the transceiver IC 216 is facilitated by at least one antenna, antenna 215, coupled to the transceiver IC 216. WCD 102 is able to wirelessly communicate with, for example, base station (BS) 105 via antenna 215. BS 105 enables WCD 102 to establish a connection server 114 via at least one of network infrastructure 140 and external network 145 (e.g., Internet).

Illustrated within non-volatile memory 202 are a number of software, firmware, and/or logic components (or modules), including timer 204, heartbeat message function 206, and firmware 208. Timer 204, heartbeat message function 206 and firmware 208 respectively enable WCD 102 to be send heartbeat messages and adapt the timing of the when the heartbeat messages are being sent so that applications and application updates can be pushed from servers 112, 114 to the WCD 102. In addition, the combination of elements on the WCD 102 allows the WCD 102 to pull applications from servers 112, 114 in the event that applications cannot be pushed from the servers. Applications can be pulled from a server instead of pushed by the server. As explained, an application or update is pushed to a client by the server automatically sending the application to the client. Applications are pulled by a client when the client sends a message or signal to the server requesting that the server send the application or update to the client.

Figure 3:
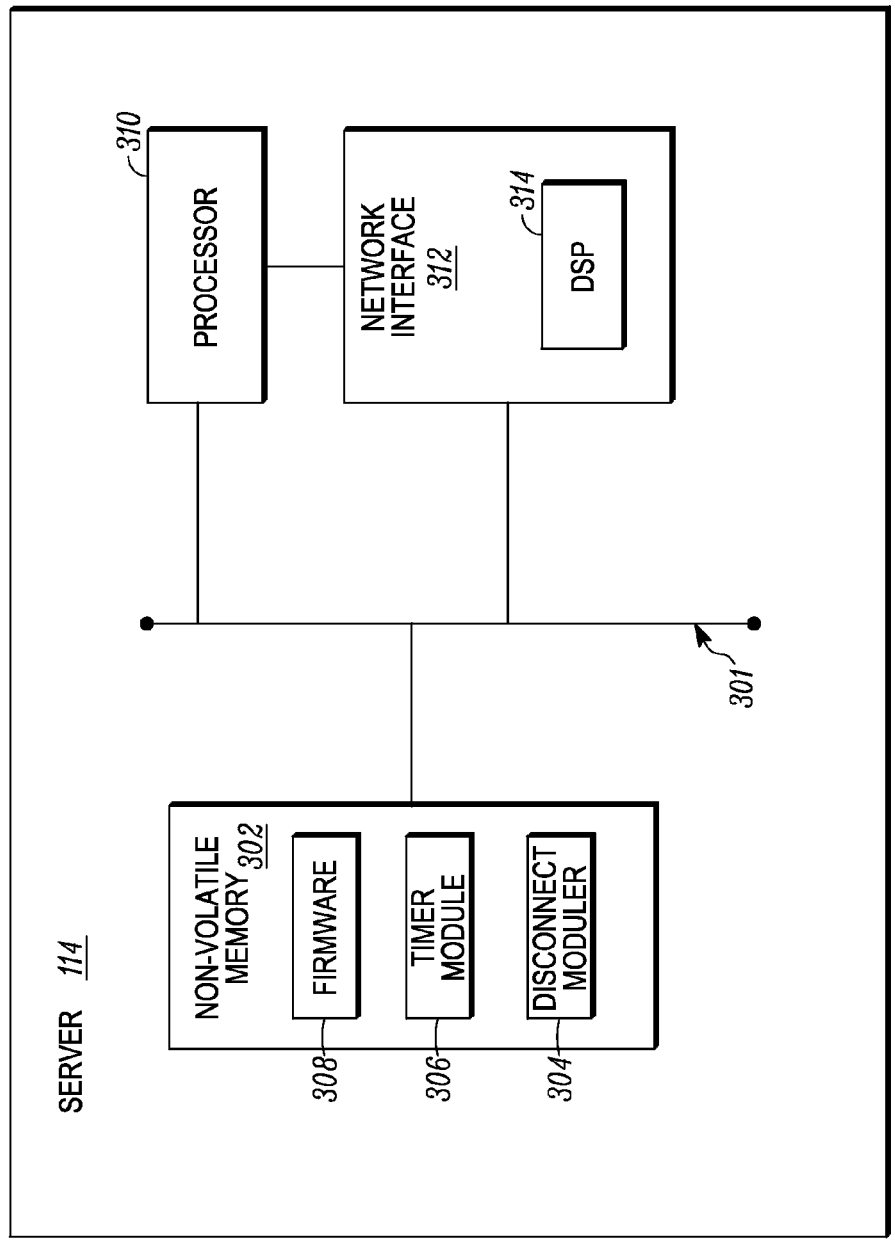
FIG. 3 is a block diagram of a server configured in accordance with some embodiments of the invention.

FIG. 3 illustrates an example block diagram of an example server 114 within a wireless communications network, according to one embodiment. In one embodiment, the server provides various services to a client where those services are periodically updated by the server. Server 114 comprises processor 310 and network interface 312, which comprises digital signal processor (DSP) 314. Processor 310 and network interface 312 are connected to non-volatile memory 302 via signal interconnect 301. The network interface module 312 and DSP 314 can be used to connect to various networks through wired and wireless connections. Memory 302 can include disconnect module 304 and timer module 306. Disconnect module 304 is used to measure network conditions to determine whether the channel between the server and the client should be maintained. Timer module 306 is used to measure time during which the channel is idle and therefore no data is sent from the server to the client or that the client has not used the channel. The timer module is set to a time out duration that is set to a given value. At the expiration of the value, the timer module causes the processor 310 and the communication interface circuitry 312 to disconnect the channel between the server 112, 114 and the WCD 102. The value of the time out duration can vary depending on the needs of the server 112, 114, the WCD 102, the WCN 100 or other factors and components.

Those of ordinary skill in the art will appreciate that the hardware components and basic configurations depicted in FIGS. 1-3 may vary. The illustrative components within WCN 100, WCD 102 and server 114 are not intended to be exhaustive, but rather are representative to highlight essential components that are utilized to implement the present invention. For example, other devices/components may be used in addition to or in place of the hardware and/or firmware depicted. The depicted example is not meant to imply architectural or other limitations with respect to the presently described embodiments and/or the general invention.

Figure 4:
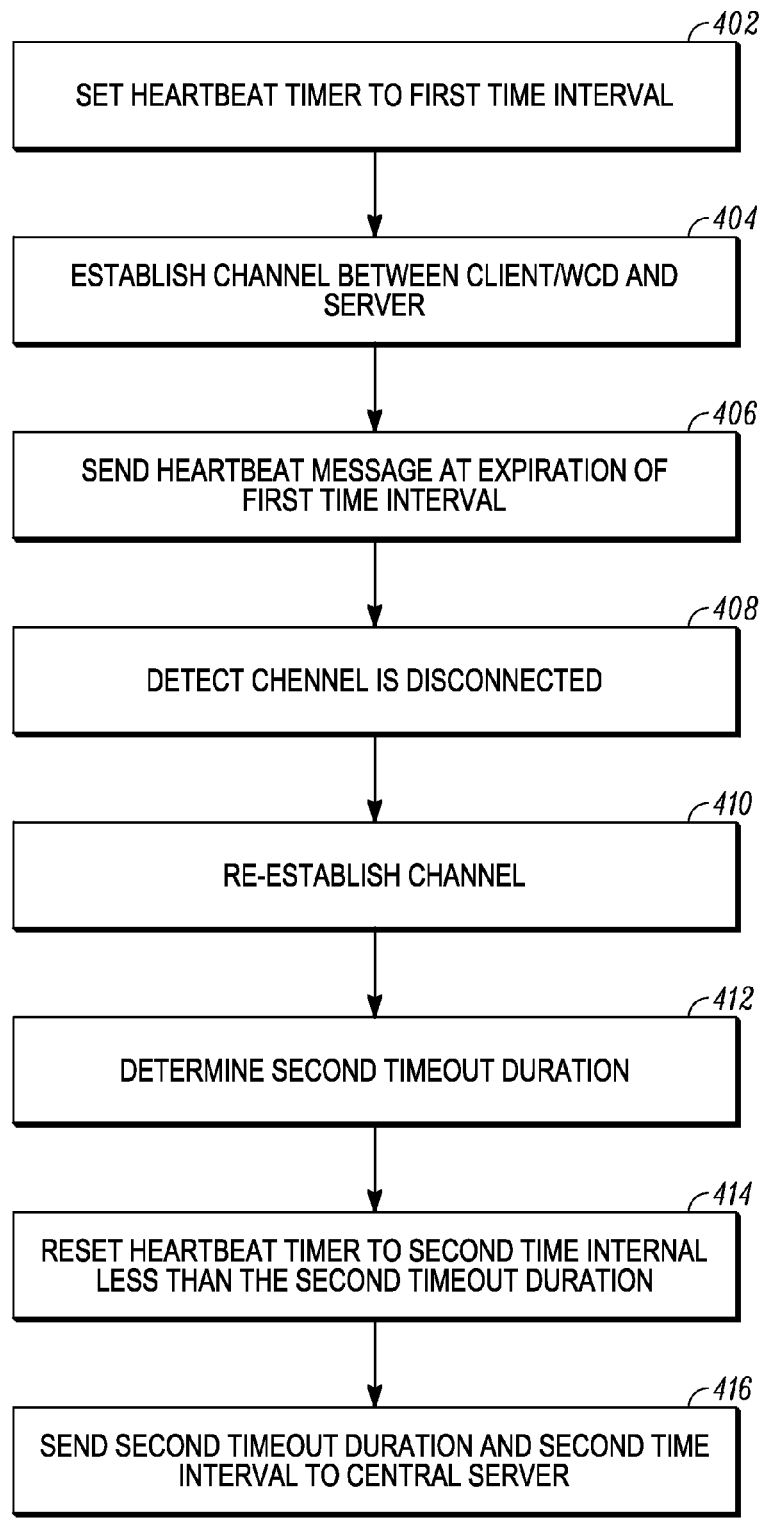
FIG. 4 is a flow chart describing the use of an adaptive heartbeat message for maintaining a push channel in accordance with some embodiments of the invention.

Turning to FIG. 4, a flow chart of the operation of the WCD 102 serving as a client receiving services from server 114 will be described. To begin, a WCD 102 desires to receive a service from server 114. The service can be one of any type of service that is provided through the internet 145 or other such network. In addition, the service can be updated by the server 114 and the service provider by the service provider pushing the update to the client. In an embodiment, a client can have new applications pushed to a client device by subscription and other services. As such, when the client operating on the WCD 102 is provided access to the service, a channel is provided between the WCD 102 and the server 114 over which the applications and updates can be provided.

In some embodiments, the channel between the WCD 102 and the server 114 needs to be maintained. As such, a heartbeat message can be sent from the WCD 102 to the server 114. As a part of the heartbeat message operation, a first time interval for heartbeat message timer, which can be a part of the heartbeat module 206 and timer 204, is set 402 at the WCD. In an embodiment, the first time interval can be set during manufacture of the WCD or at some other time before the WCD is used on the network 140, 145 or accesses a server 112, 114. The heartbeat message timer designates the first time interval at which the WCD 102 sends a heartbeat message to the server 114 using the networks 140, 145. The heartbeat messages are sent over the networks 140, 145 using known methods and protocols and are sent over a channel that is established 404 between the client, e.g. WCD 102, and the server 112, 114. In an embodiment, the channel is a TCP/IP channel that allows the server to push applications and updates to the client, and the heartbeat messages are TCP/IP messages. The heartbeat messages permit the WCD 102 and the server 112, 114 to be aligned with one another so that the server 112, 114 can push applications and updates from the server to the WCD 102.

The first heartbeat time interval for the heartbeat module 206 and timer 204 can have any given interval or duration. In an embodiment, the first heartbeat time interval is set to an interval that is less than the timeout duration of the server 112, 114. At the expiration of the timeout duration, a server 112, 114 will disconnect the push channel established in step 404 between the server and the client over which the server will push an application or an update. While that channel or path is maintained, the server can push the application or update. When the timeout duration expires, the channel is disconnected and must be re-established by either the client or server in order of the client to receive the application from the server, where the application or update is either pushed to the client by the server or pulled by the client from the server.

With the establishment of the push channel, the WCD 102 will send 406 heartbeat messages to the server 112, 114 from which it will receive an application or an update. As is understood, the heartbeat message will be sent at an interval set by the heartbeat timer. For any number of reasons, it is possible for the server or for a network entity between the WCD 102 and the server 112, 114 to disconnect the channel push channel between the client and the server. The channel can be disconnected because of the quality issues on the channel, issues with the WCD 102, issues with the server 112, 114 or because the WCD 102 does not use the channel to receive updates or applications from the server. The WCD 102 will detect 408 that the channel has been disconnected and determine that disconnection occurs prior to the expiration of the first time interval of the heartbeat timer. In order for the WCD 102 to receive the application or the update, it is expected that the WCD 102 will re-establish 410 the push channel with the server 112, 114. In an embodiment, the channel can be re-established by the server 112, 114.

The WCD 102 can determine 412 a second timeout interval for the server. In an embodiment, the WCD calculates the second time interval by using the known first timeout interval and the time that the push channel was disconnected. In another embodiment, the WCD calculates the second time interval by detecting a given number of channel disconnects. After the given number of disconnects, the WCD 102 can average the times to find a suitable second time interval that will prevent the channel from being disconnected in the future by the WCD sending heartbeat messages.

It is understood, that other methods and data points can be used to determine the second timeout duration for the server. In an embodiment, the second timeout interval is determined after the re-establishment of the push channel or when the push channel has been disconnected. As is understood, the channel between the client and the server is to be maintained in order for the server to be able to push the applications and updates to the client. Thus, the WCD 102 resets 414 the duration of the timer 204 to the second time interval for the heartbeat module 206. The WCD has calculated the second timeout interval and in order for the server to not disconnect the channel, the second duration for the timer is sent to be less than the second timeout interval. In this way, the heartbeat module can send 416 the heartbeat messages to the server to maintain the channel according to the second time interval.

In an embodiment, the WCD 102 sends 418 the second timeout duration to a central server, such as server 112, 114 or another entity within the network 140, 145 for storage and use by other WCDs. In addition, the WCD 102 can send the second timer interval that is used by the heartbeat module 206 and timer 204 to send heartbeat messages to the server. The second timeout duration and the second timer interval are sent to the central server to be used by other entities, such as additional WCDs within the network that use channels such as the channel between the client and the server. As such, another WCD can access the central server to obtain the timeout durations used by a server 112, 114 in order to maintain the channel used to receive pushed applications and updates.

Figure 5:
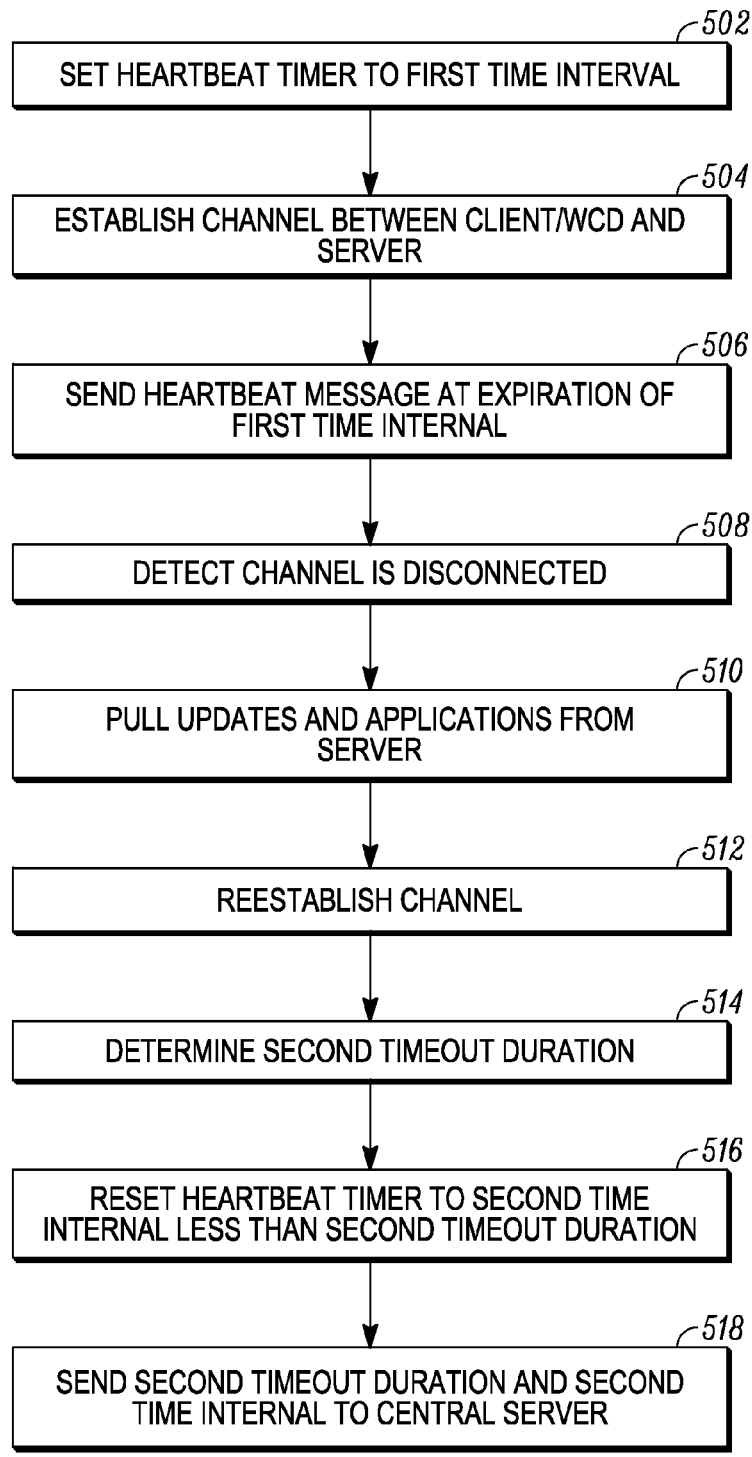
FIG. 5 is a flow chart describing the use of an adaptive heartbeat message for maintaining a push channel in accordance with other embodiments of the invention.

FIG. 5 is a flow chart of the alternative operation of the WCD 102 serving as a client receiving services from server 114. To begin, a WCD 102 desires to receive a service from server 114. The service can be one of any type of service that is provided through the internet 145 or other such network. In addition, the service can be updated by the server 114 and the service provider by the service provider pushing the update to the client. Accordingly, a channel is provided between the WCD 102 and the server 114 over which the applications and updates can be provided.

In some embodiments, the channel between the WCD 102 and the server 114 needs to be maintained by sending, a heartbeat message from the WCD 102 to the server 114. As a part of the heartbeat message operation, a first time interval for a heartbeat message timer is set 502. The first heartbeat time interval for the heartbeat module 206 and timer 204 can have any given interval or duration. The heartbeat messages are sent over a channel that is established 504 between the client, e.g. WCD 102, and the server 112, 114. In an embodiment, the first heartbeat time interval is set to an interval that is less than the timeout duration of the server 112, 114. At the expiration of the timeout duration, a server 112, 114 will disconnect the channel established in step 504 between the server and the client over which the server will push an application or an update.

With the establishment of the channel, the WCD 102 will send 506 heartbeat messages to the server 112, 114. As is understood, the heartbeat message will be sent according to the first time interval set by the heartbeat timer. For any number of reasons, it is possible for the server or for a network entity between the WCD 102 and the server 112, 114 to disconnect the channel push channel between the client and the server. The WCD 102 will detect 508 that the channel has been disconnected and determine that disconnection occurs prior to the expiration of the first time interval for timer.

In an embodiment, the WCD 102 may require that the updates or a new application from the server even though the channel has been disconnected. In this case, the WCD 102 changes mode from expecting the server 112, 114 to push updates and applications to the WCD 102 to a mode that requires the WCD 102 to pull the updates and applications from the server. In an embodiment, the WCD will use peripheral device protocol (PDP) messages to pull applications and updates for the server. Thus after the channel has been disconnected, the WCD sends messages to request 510 to the server to send updates and applications to the client. In this way, no channel needs to be maintained between the client and the server and the client pulls needed data from the server.

After a period of time, the WCD 102 may return to a push mode in order to receive applications and updates directly from the server 112, 114. In order for the WCD 102 to receive the application or the update in a push mode, it is expected that the WCD 102 will re-establish 512 the push channel with the server 112, 114. In an embodiment, the channel can be re-established by the server 112, 114. The WCD 102 can determine 514 a second timeout interval for the server so that it can maintain the re-established channel. In an embodiment, the WCD calculates the second timeout interval as described above. The WCD 102 resets 516 the duration of the timer 204 for the heartbeat module 206. The WCD has calculated the second timeout interval and in order for the server to not disconnect the channel, the second duration for the timer is sent to be less than the second timeout interval. In this way, the heartbeat module can send 518 the heartbeat messages to the server to maintain the channel according to the second timeout interval. In an embodiment, the WCD 102 sends 520 the second timeout duration and the second time interval to a central server for use by other entities.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method comprising:
    establishing a channel between a server and a client wherein the channel is disconnected after an expiration of a first timeout duration period, wherein the channel being a push channel used to push services from the server to the client;
    sending a heartbeat message from the client to the server wherein the heartbeat message is sent at the expiration of a timer having a first time interval wherein the first time interval being less than the first timeout duration period and wherein the heartbeat message maintains the channel;
    detecting that the channel is disconnected before the expiration of the first time interval;
    sending a message from the client to the server to pull services from the server wherein the message request updates from the client for the server;
    determining a second timeout duration period from detecting the channel is disconnected, and
    resetting the first time interval to a second time interval for the sending of the heartbeat message wherein the second time interval being less than the second timeout duration period.

2. The method according to claim 1 further comprising reestablishing the channel after detecting that the channel is disconnected.

3. The method according to claim 1 further comprising sending the second time interval to a central server so that the second time out interval can be used by other clients receiving data from the server when the channel is to be maintained by a heartbeat message.

4. The method according to claim 1 wherein the first time interval and the second time interval being set to align updated services provided by the server to the client.

5. The method according to claim 1 wherein the first time interval being set before at least one of implementation of the client on a wireless communication network and connection of the client with the server for a first time.

6. The method according to claim 1 wherein the channel being disconnected because of at least one of poor channel conditions and non-use of the channel.

7. The method according to claim 1 wherein determining a second time interval comprising detecting a given number of channel disconnects to determine the second time interval.

8. The method according to claim 1 wherein the channel is a TCP/IP channel to push updates from the client to the server and wherein the client is a wireless communication device such that at least a part of the push channel is provided over a wireless communication connection.

9. A method comprising:
    establishing a channel between a client and a server wherein the channel is used for server to push services to the client and wherein the channel can be disconnected after an expiration of a first timeout duration if no data is sent over the channel during the first timeout duration;
    sending a heartbeat message from the client to the server so that data is sent over the channel wherein the heartbeat message being sent at the expiration of a time interval that is less than the first timeout duration;
    detecting that the channel be disconnected by the server before the expiration of the first time interval, and
    sending a message from the client to the server after the channel is disconnected to pull the services to the client from the server that were pushed from the server when the channel was established.

10. The method according to claim 9 wherein the channel is a transport control protocol/internet protocol channel and the message is a peripheral device protocol message.

11. The method according to claim 9 further comprising:
    detecting that the channel is reestablished after the channel is disconnected;
    determining a second timeout duration wherein at the expiration of the second timeout duration the reestablished channel is disconnected, and
    resetting the first time interval to a second time interval so that the heartbeat message is sent to the server at the expiration of the second time interval and wherein the second time interval is less than the second timeout duration.

12. The method according to claim 11 further comprising sending the second time interval to a central server so that the second time interval can be used by other clients receiving data from the server when the channel is to be maintained by a heartbeat message.

13. The method according to claim 9 wherein determining a second time interval comprising detecting a given number of channel disconnects to determine the second time interval.

14. The method according to claim 9 wherein the first interval being set to align updated services provided by the server to the client.

15. The method according to claim 9 wherein the first time interval being set before at least one of implementation of the client on a wireless communication network and connection of the client with the server for a first time.

16. An apparatus comprising:
   a transceiver for sending messages from a client to a server over a channel and for receiving messages from the server over the channel;
   a memory for storing a heartbeat timer value wherein the heartbeat timer value being less than a time out duration and wherein after the expiration of the time out duration the channel between the client and the server being disconnected;
   a processor coupled between the transceiver and the memory wherein the processor detects that the channel is disconnected and determines a second time out interval which is less than the first time out interval and resets the heartbeat timer value to a second interval which is less than the determined second time out duration, wherein the processor further creates a message to be sent by the transceiver to the client to pull services from the server when the channel is disconnected.

17. The apparatus according to claim 16 wherein the processor further creates a message to be sent by the transceiver to a central data base wherein the message contains the second interval to be used by other clients connected to the server.

18. A method comprising:
   establishing a channel between a server and a client wherein the channel is disconnected after an expiration of a first timeout duration period;
   sending a heartbeat message from the client to the server wherein the heartbeat message is sent at the expiration of a timer having a first time interval wherein the first time interval being less than the first timeout duration period and wherein the heartbeat message maintains the channel;
   detecting that the channel is disconnected before the expiration of the first time interval;
   determining a second timeout duration period from detecting the channel is disconnected, and
   resetting the first time interval to a second time interval for the sending of the heartbeat message wherein the second time interval being less than the second timeout duration period
   sending the second time interval to a central server so that the second time out interval can be used by other clients receiving data from the server when the channel is to be maintained by a heartbeat message.

* * * * *